United States Patent [19]
Sandler et al.

[11] Patent Number: 5,469,176
[45] Date of Patent: Nov. 21, 1995

[54] FOCUSED ARRAY RADAR

[75] Inventors: Sheldon Sandler, Lexington; Alan Crandall, Lunenberg; Daniel Schwarzkopf, Stow; Gilbert Johnson, Holliston; Rudolph Borkowski, Townsend, all of Mass.

[73] Assignee: Geo-Centers, Inc., Newton Centre, Mass.

[21] Appl. No.: 115,409

[22] Filed: Aug. 31, 1993

[51] Int. Cl.[6] .................................... H01Q 3/22
[52] U.S. Cl. .................................. 342/375; 342/81
[58] Field of Search ........................ 342/375, 154, 342/22, 82, 85, 81, 126

[56]                References Cited
U.S. PATENT DOCUMENTS

| 2,041,600 | 5/1936  | Früs          | 342/361 |
| 5,063,390 | 11/1991 | Konig         | 342/375 |
| 5,339,080 | 8/1994  | Steinway et al. | 342/22  |

OTHER PUBLICATIONS

Schutz, "A Digitally Controlled Beam–Steered Array," Ultra–Wideband Radar, pp. 299–308.

Bruce Noel, "Ultra–Wideband Radar: Proceedings Of The First Lost Alamos Symposium", CRC Press, Inc., 1991.

*Primary Examiner*—Thomas H. Tarcza
*Assistant Examiner*—Dao L. Phan
*Attorney, Agent, or Firm*—Wolf, Greenfield & Sacks

[57]                 ABSTRACT

A method and apparatus for resolving a radar return by an object or layer below the earth's surface from a radar return of an air-to-earth interface. More specifically, a method and apparatus for generating short pulsewidth, broad bandwidth RF signals and for effecting control and timing of transmitted and received radar signals in order to focus an antenna illumination pattern. The apparatus includes an antenna array including a plurality of antenna elements which transmit and receive the RF pulsed signals and a custom control module which generates the control signals fed to the antenna array to delay the RF pulse signals with respect to each other, upon transmission and receipt, in order to form transmit and receive antenna illumination patterns.

21 Claims, 11 Drawing Sheets

FOCUSED ARRAY RADAR

FIELD OF THE INVENTION

This invention concerns a method and apparatus for locating objects beneath the earth's surface with pulsed electromagnetic signals, for effecting generation, transmission and reception of the pulsed electromagnetic signals and for focusing an illumination pattern of the transmitted and received pulsed electromagnetic signals.

BACKGROUND OF THE INVENTION

Figure 1:
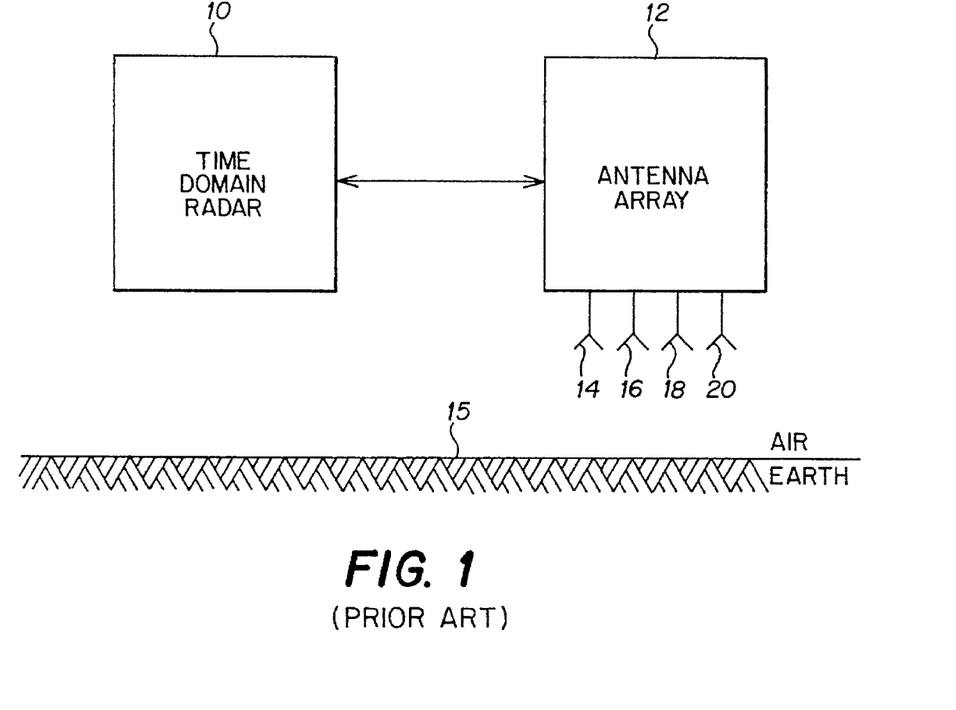
FIG. 1 is a block diagram of a prior art time domain radar suitable for practicing sub-surface radar measurements.

It is known that time domain ground penetrating radar may be used to study the characteristics of layers below the earth's surface. FIG. 1 shows a time domain radar 10 coupled to an antenna array 12 which may be used for such ground penetrating radar measurements. In this embodiment, a plurality of pulsed signals of electromagnetic energy are transmitted by antenna elements 14, 16, 18 and 20 within the antenna array. The pulsed signals are transmitted towards the earth and any back scattered pulses are then collected by the antenna array and coupled to the time domain radar.

One problem with the use of time-domain radars for studying sub-surface strata is that there is a large reflection of the pulsed signal transmitted by the radar at the air-to-earth interface 15 because of the difference in magnitudes of the dielectric constants of air and the earth. The amplitude portion of the collected signal due to the air-to-earth interface therefore tends to mask any portion of the signal reflected from the sub-surface layers of the earth because the air-to-earth interface portion is larger in magnitude. It is known in the prior art that this problem can be overcome with extensive post processing of the received electromagnetic signals to recover the portions of the collected signal due to reflections from sub-surface layers. This is possible because the properties of the earth's surface are not changing as a function of time and can therefore be eliminated by the post-processing. However, a disadvantage to using such extensive post processing is that the data may not be processed and viewed immediately after collection (real-time) by the user of the radar.

In addition to geophysically mapping hidden structures below the earth's surface, time domain ground penetrating radar may also be used for purposes such as detecting sub-surface metallic utilities (e.g., buried pipes, wires, storage tanks), detecting gas leaks by changes in dielectric constant of the soil from the gas, detecting buried chemical containers and for detecting buried land mines and unexploded ordinances. However, a problem with the use of time domain radar for these applications is that a vast amount of data must be collected and processed immediately upon reception in order for the information to be viewed in real time.

Another limitation is that the time domain ground penetrating radar requires short-pulse width, broad bandwidth pulsed RF signals in order to obtain desired spatial resolutions. For example a resolution of penetration into the earth on the order of inches or less requires pulse widths on the order of picoseconds or less. Thus, there is a need for an apparatus for generating, transmitting and collecting such short pulse width electromagnetic signals. However, a problem is there are no such apparatus commercially available to effect creating and controlling these short pulse width signals.

In addition, given the desired resolutions, a typical pulse signal bandwidth is on the order of an octave or more. The center frequency signal can be varied depending upon the desired penetration of the earth's surface. Therefore, there is a need for broad bandwidth antenna elements capable of transmitting and receiving the pulsed signals without distorting the signals.

For the foregoing reasons, there is a need for a method and apparatus for separating a portion of the pulsed received signal due to the sub-surface objects, from the portion due to reflection of the air-to-ground interface. In addition, there is a need for an apparatus for effecting control of the time domain radar in order to generate, transmit and receive the electromagnetic pulses and to obtain the desired pulse width resolutions. There is also a need for method and apparatus for reducing the amount of collected pulsed signal data which must be processed so that the data may be viewed in real time.

SUMMARY OF THE INVENTION

The present invention is directed to a method and apparatus for resolving the radar return of an object or layer below the earth's surface from the large return of the interface between the earth's surface and air. In addition, the invention is directed to a method and apparatus for generating short pulse width, broad bandwidth RF signals to be transmitted and received by the radar and for controlling the signals transmitted and received by the radar in order to focus the antenna illumination patterns.

The apparatus comprises an antenna array including a plurality of antenna elements which transmit and receive a plurality of broad bandwidth pulsed signals and a custom control module which generates the control signals required by the antenna array to transmit and receive the pulsed signals and which delays the timing signals fed to the antenna elements with respect to one another in order to form, transmit and receive antenna illumination patterns.

With this arrangement, the transmit and receive antenna illumination patterns may be focused and the focal point of the pattern may be scanned across the width of the antenna. In addition, a penetration distance of the transmitted and received return signal may be set to measure different depths of penetration into the ground with a desired resolution. Thus, the return from the focal point of the illumination pattern will be measured and the return from the air-to-ground interface and the overall background clutter will be ignored. In addition, a specific depth in the ground and specific focal point across the width of the antenna can be measured without a large amount of post signal processing.

In accordance with a further aspect of the present invention, the custom control module includes a custom control board for controlling the plurality of antenna elements. The custom control board comprises a timing signal generator which generates and outputs a timing signal, divides the timing signal into a plurality of transmit and receive parallel timing signals and a plurality of delay elements which delay the timing signals relative to one another.

With this control mechanism it is possible to generate short pulsewidth, fast rise and fall time electromagnetic pulses which can be delayed relative to one another for antenna focussing and to achieve a desired propagation spatial resolution of the transmitted signal on the order of inches.

BRIEF DESCRIPTION OF THE DRAWINGS

FIG. 8(a–b is a schematic diagram of the pulse-reception interval generator of FIG. 7; and FIGS. 9a-1 and 9b-2, 9b are schematic diagrams of portions of the custom control board of FIG. 7.

DETAILED DESCRIPTION

Figure 2A:
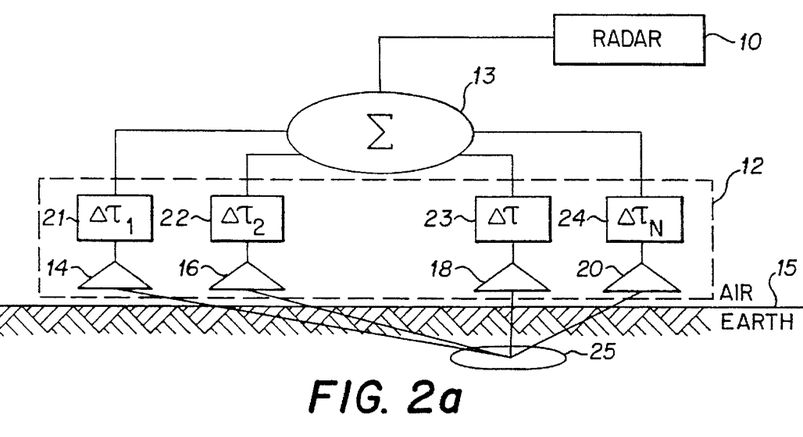
FIGS. 2a–2c illustrate the concept of focusing of an array antenna by the time delay concept according to an embodiment of the present invention.
Figure 2B:
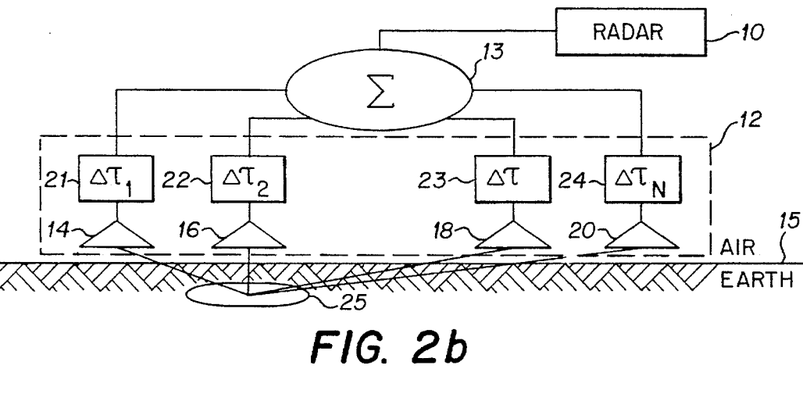
Figure 2C:
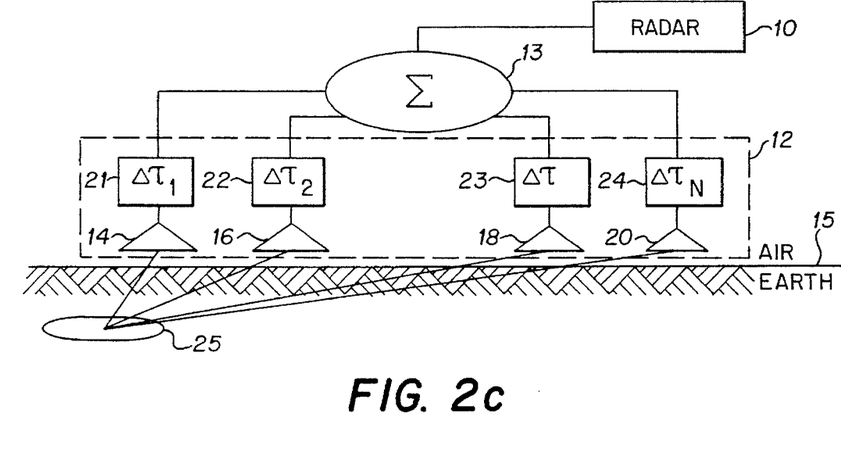

In accordance with this invention, one way of minimizing the masking effects of the large amplitude back scattered radar signal from the air-to-earth interface, is to use antenna focusing concepts to focus the antenna pattern of signals transmitted and received by the antenna array. FIGS. 2a–2c illustrate a block diagram of a typical antenna array which may be used to practice time delay focusing concepts where an antenna illumination pattern 25 may be swept across a width of the antenna array 12, as illustrated by FIGS. 2a–2c.

In FIGS. 2a–2c the antenna array includes antenna elements which are represented by triangles 14, 16, 18 and 20. In a transmit mode, radar 10 couples an electromagnetic pulse to a divider/summer 13 which in turn divides the pulse into parallel pulses and couples the parallel pulses to the antenna array. The antenna array in turn couples the pulses to air. Each parallel pulse after being divided into plural parallel pulses is passed through micro time delay elements 21, 22, 23 or 24 and is delayed with respect to the other parallel pulses. The micro delay established between the parallel pulses creates the focused transmit antenna illumination pattern 25 across the width of the array antenna. By varying the time delays 21, 22, 23 and 24, the illumination pattern can be swept across the width of the antenna array face as is shown in FIGS. 2a–2c.

Figure 3:
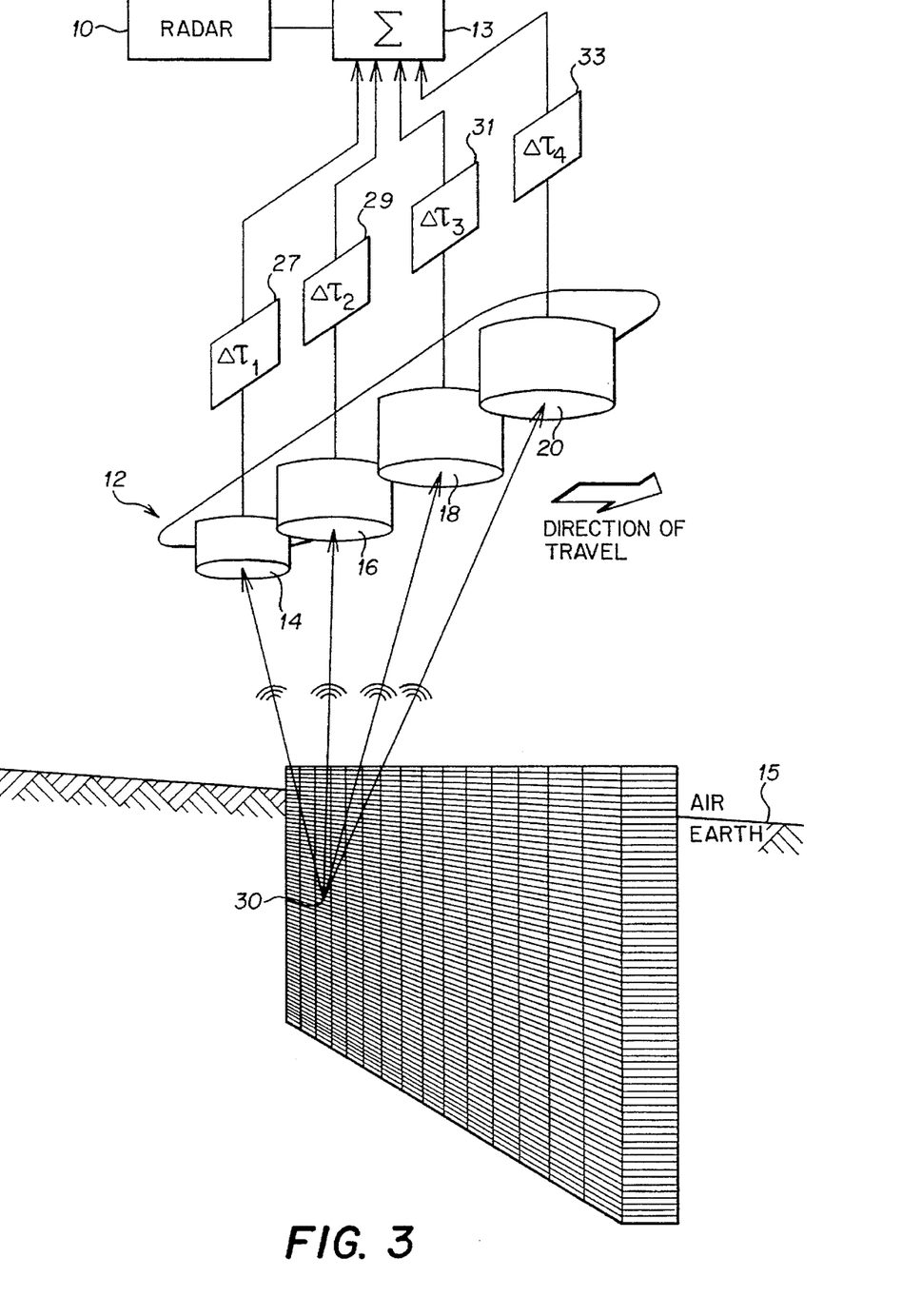
FIG. 3 illustrates the concept of focusing of the array antenna to a certain penetration depth of the earth's surface according to an embodiment of the present invention.

Referring now to FIG. 3, there is shown the antenna array including antenna elements 14, 16, 18 and 20 operating in a receive mode. In the receive mode, collection of reflected pulses from a cell 31 beneath the earth's surface, by the antenna array 12, can be achieved by delaying a period of time before turning on the antenna elements. A macro time delay from transmission of the pulses to turning on the antenna elements receiving the reflected pulses, can be selected to create a penetration distance of the receive illumination pattern into the ground layer. Thus the portion of the reflected signal due to the air-to-earth interface 15 can be eliminated from the collected signal without the need for extensive post processing of the collected signals.

Further, each electromagnetic signal received by each antenna element can be delayed relative to one another to establish a micro time delay between the received pulses by passing each received pulse through a micro delay element 27, 29, 31, and 33 similar to that of the transmit micro delay elements, as best shown in FIGS. 2a–2c. This micro delay between pulses received by the antenna elements provides for the received illumination pattern to be swept across the width of the antenna array. Thus, an amount of received data collected can be reduced to that reflected by a particular cell and therefore extensive post processing of the collected pulses can be eliminated. This technique provides for viewing of the collected data in real time since extensive post-processing of the collected data is not required.

An ideal signal for time domain radar applications is an impulse of zero duration and infinite frequency response. In practice a short pulsewidth, broad bandwidth electromagnetic pulse with fast rise and fall times is required for time domain radar applications. For example in a specific embodiment, a pulsewidth of 50 picoseconds is required to obtain desired spatial resolutions. Thus, there is a need for antenna elements with a broadband frequency response to minimize distortion of the broad bandwidth pulses. In addition, there is also a need for each antenna element to be small in order to minimize the size of the overall antenna array.

Figure 4:
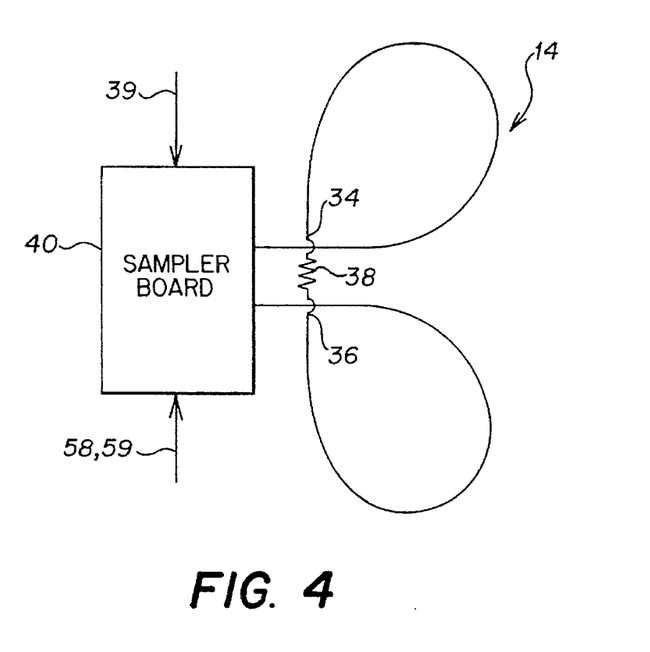
FIG. 4 is a drawing of an antenna element suitable for practice with the present invention.

To meet the size considerations, the antenna elements must be of finite length. However a problem with finite length antenna elements is that reflections from the ends of the antenna element can propagate back along the structure of the antenna element and can result in the reflections dominating the characteristics of the pulses transmitted or received by the antenna element. Therefore, in a preferred embodiment of the present invention a rhombus antenna design is used for reducing the reflections from the ends of the antenna element by terminating the ends 34 and 36 of the antenna in a lumped resistance 38, as shown in FIG. 4. The rhombus antenna element has the physical characteristic of being small, yet it also possesses the electrical characteristic of an infinitely long antenna. Thus the rhombus antenna element of FIG. 4 is a broad bandwidth antenna element which produces minimal transmitted and received pulse distortion. Additional details of the antenna element as shown in FIG. 4 will be discussed below.

Figure 5:
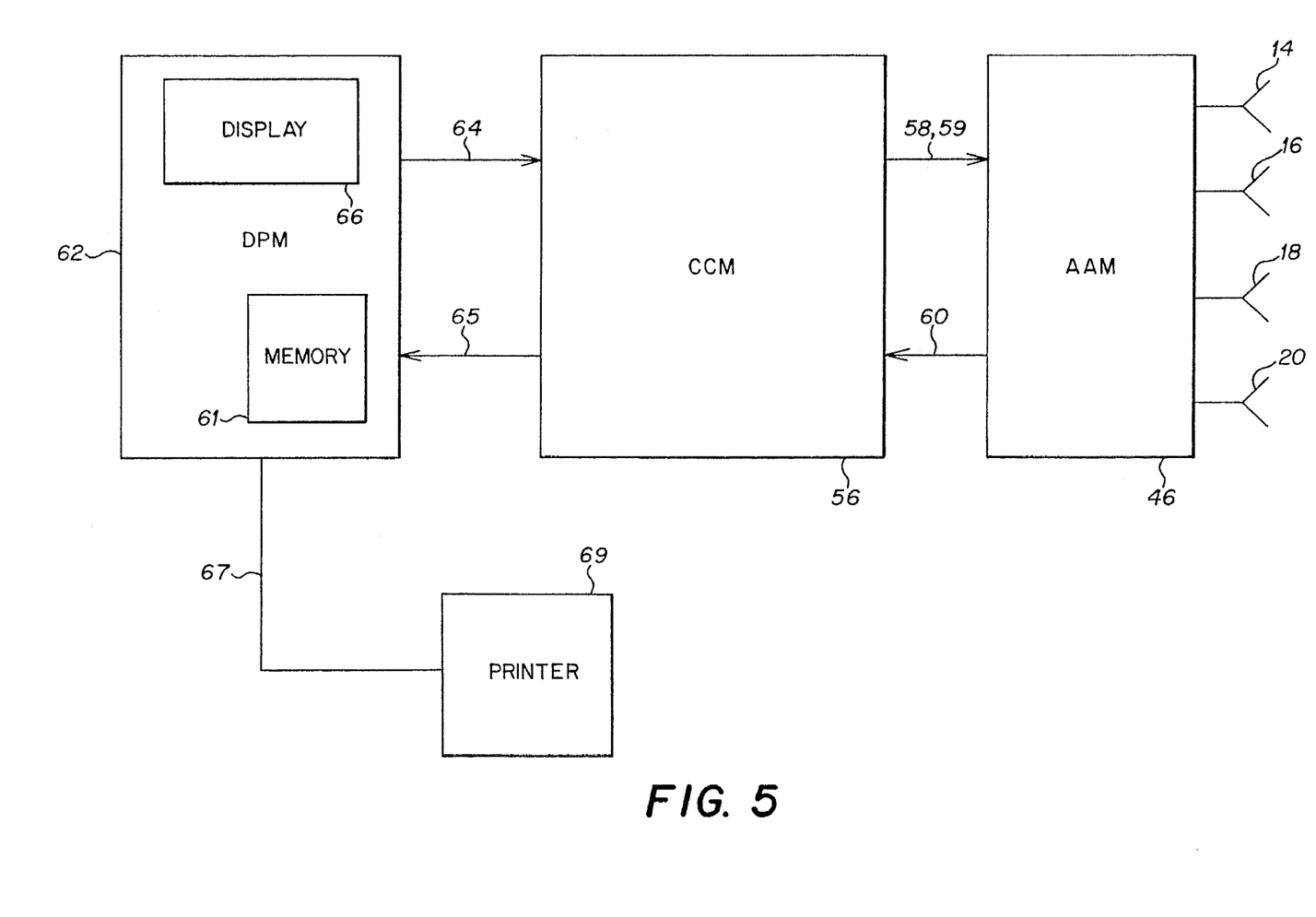
FIG. 5 is a block diagram of a preferred embodiment of the present invention.

FIG. 5 illustrates a block diagram of an embodiment of the present invention. There is provided an antenna array module (AAM) 46 including the plurality of antenna elements 14, 16, 18 and 20. The AAM transmits and receives short pulse width, broad bandwidth electromagnetic pulses. Thus, in this specific embodiment transmission and reception of the pulses are accomplished using the same antenna elements. The AAM is coupled to a custom control module (CCM) 56. The CCM generates and outputs a plurality of transmit 58 and receive 59 control signals to the AAM for controlling the time delays of the transmitted and received pulses in order to form the transmit and receive antenna illumination patterns.

In addition, the CCM receives a plurality of received pulses 60 from the antenna array module. The CCM samples the received pulsed signals, converts the sampled values to digital data and temporarily stores the digital data. The CCM is also coupled to a data processing module (DPM) 62. The DPM receives the temporarily stored digital data 65 from the CCM after transmitting a request 64 to transfer the data to the DPM.

The DPM 62 upon receipt of the digital data from the CCM, processes the data and stores the data in local memory 61. The local memory 61 may be any temporary memory such as a random access memory (RAM) or any permanent memory such as a disk drive or other permanent medium. In addition, the DPM may also be connected to a printer 68 via an interface cable 67 for outputting a hard copy of the data. In the alternative, the data may be output via a display 66 for real time display to the user of the radar. In a preferred embodiment of the invention the data processing module is an IBM compatible personal computer. However, equivalent forms of data processors are also contemplated according to this invention.

Figure 6:
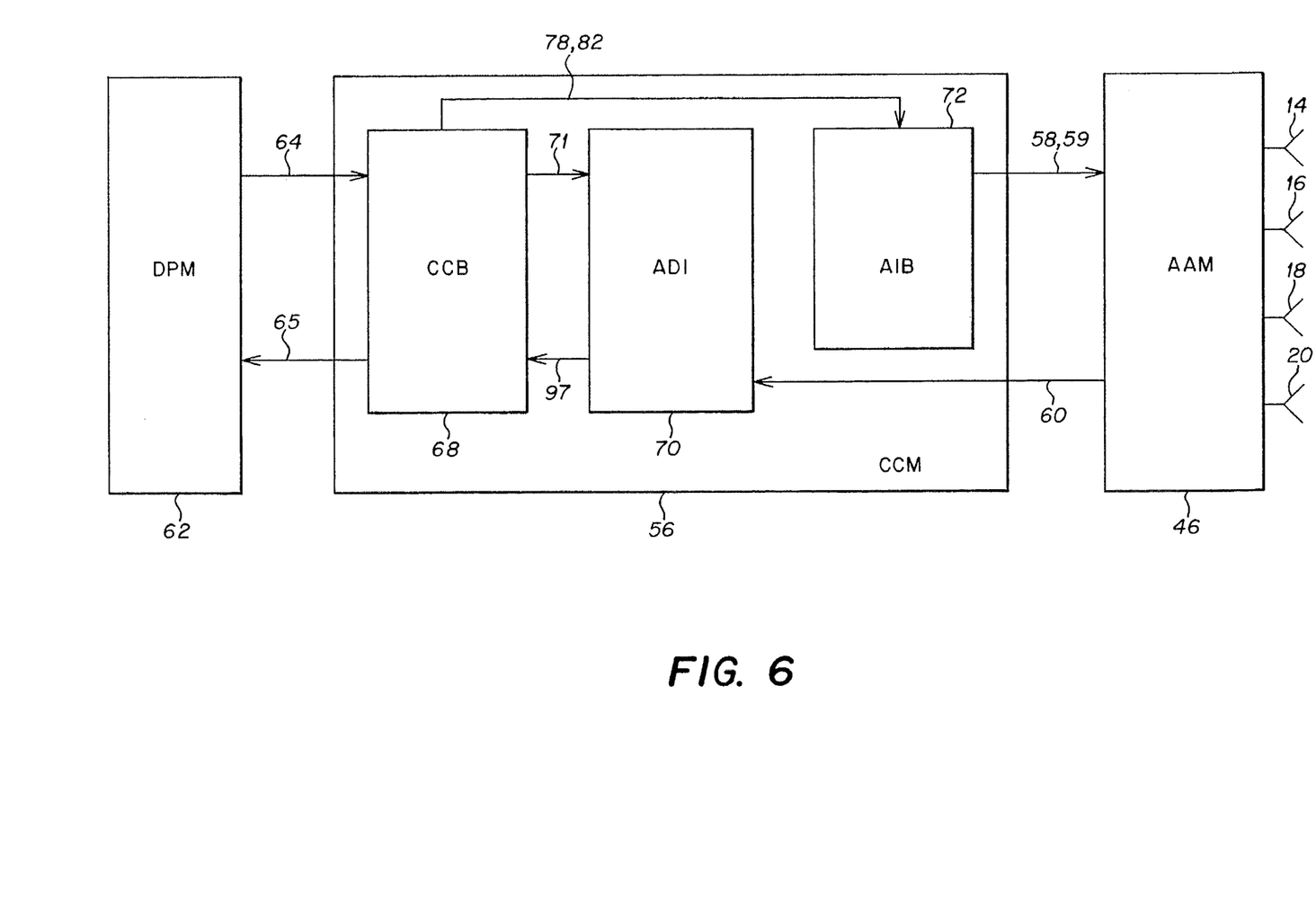
FIG. 6 is a more detailed block diagram of the embodiment of FIG. 5.

FIG. 6 shows a more detailed block diagram of the CCM 56 of FIG. 5 and its connections to the DPM 62 and the AAM 46. The CCM 56 includes a custom control board (CCB) 68 which generates a plurality of transmit 78 and receive 82 timing signals and outputs these timing signals to an array interface board (AIB) 72. The AIB operates on the transmit and receive timing signals and outputs the corresponding transmit 58 and receive 59 control signals to the AAM 46. The transmit control signals control the antenna elements to generate the pulsed electromagnetic signals and to sweep the transmit antenna illumination pattern across the width of the antenna aperture as discussed above. The receive control signals turn on the antenna elements after a desired time delay, and sweep the receive antenna illumination pattern across the width of the antenna aperture and to a desired ground penetration as discussed above.

Upon reception of back-scattered electromagnetic pulses from objects within the transmit and receive illumination patterns, the received pulses 60 are output by the AAM to an analog-to-digital interface (ADI) board 70. The ADI board amplifies the received pulses, samples the amplified pulses into an analog value, converts the sampled analog voltage value to a digital value and temporarily stores the digital value for later transfer to the CCB 68. Upon receipt of a transfer to CCB signal 71 from the CCB, the ADI board outputs the digital data 97 to the custom control board 68. The CCB preliminarily processes the digital data and temporarily stores the preliminary processed (pre-processed) digital data for later transfer to the DPM.

Figure 7:
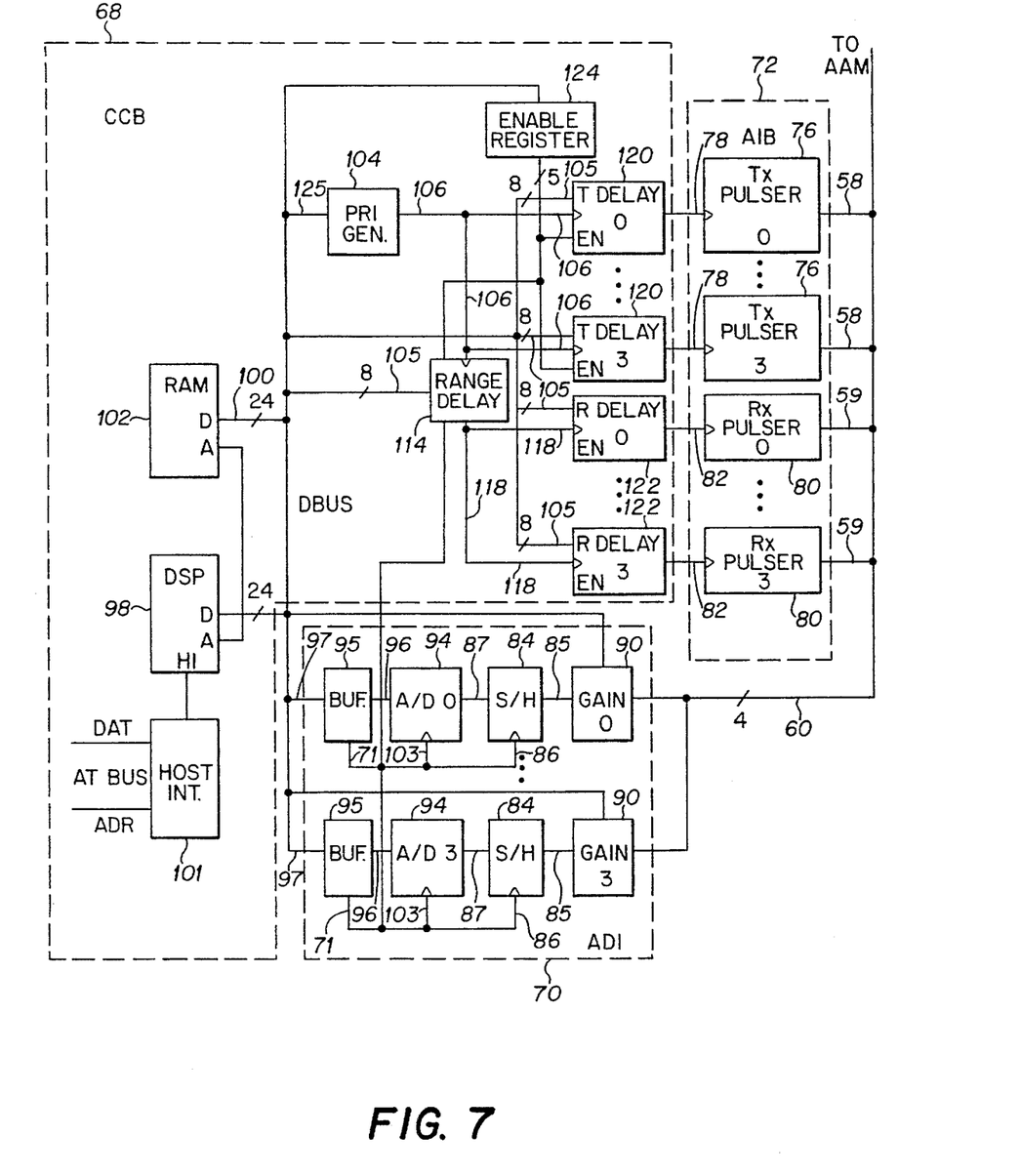
FIG. 7 is a more detailed block diagram of the custom control module of FIG. 6.

FIG. 7 is a more detailed block diagram of the CCB 68, the ADI board 70 and the AIB 72 of FIG. 6. The AIB 72 includes a plurality of transmit 76 and receive 80 pulsers which amplify and convert the transmit 78 and receive 82 timing signals to an appropriate voltage and appropriate rise and fall times, for pulsing on and off the antenna elements. For example in a specific embodiment of the invention, the AIB board receives TTL logic timing signals (0.8 to 2.4 V with 2 nanosecond rise and fall times) and converts the timing signals to 30 volts peak with 500 picosecond rise and fall time control signals. These amplified, fast rise and fall time signals are necessary to reduce errors resulting from cabling losses between the AIB and the AAM, and from triggering errors of the antenna elements.

Referring now to FIG. 4, in a preferred embodiment of the invention, the antenna element also includes a commercially available sampler board 40 including a transistor (not shown) biased by a bias signal 39 to operate in an avalanche mode. The transistor, when driven by the transmit control signal 58 generates pulsed electromagnetic signals. The sampler board also includes circuitry (not shown) for shaping the receive control signal 59 and a diode bridge circuit (not shown) which conducts for a duration of the shaped control signal, thereby turning on the antenna elements to receive RF pulses. The diode bridge transfers a charge to a capacitor (not shown). The charge on the capacitor is then buffered and amplified and output to the ADI board as signal 60. Thus in a specific embodiment of the invention, the diode bridge receives a 1 GHz center frequency RF pulse and transforms the pulse to a low frequency center frequency in the 1 to 100 KHz range.

The antenna elements when operating in a receive mode and turned on, output a plurality of received low frequency pulses 60 to the ADI board 70. The ADI board includes a plurality of channels in parallel for processing the received pulses. Each parallel channel includes an amplifier 90 which amplifies the pulse. In addition, each channel includes a sampler 84 which receives the amplified pulse and samples an analog voltage value of the amplified pulse 85 upon receipt of a convert-to-digital signal 86 output by the CCB. The sampled analog voltage values 87 are held in a buffer portion of the sample and hold circuit 84 until they can be converted to a digital value.

Upon receipt of a convert to digital signal 103 from the CCB, an analog-to-digital converter 94 converts the analog value held in the sample and hold buffer to a digital word 96. In this specific embodiment of the invention the A/D converter converts the analog value to a 12-bit digital word. The plurality of digital words 96 are stored in a plurality of buffers 95 until the digital words can be transferred to the CCB. Upon receipt of the transfer signal 71 from the CCB, the digital words 97 are output to the CCB 68. In this specific embodiment the AIB includes four parallel channels for processing pulses output by four antenna elements, each channel including the amplifier 90, sample-and-hold circuit 84, analog-to-digital converter 94, and the buffer 95.

The CCB 68 includes a digital-signal processor (DSP) 98. In this preferred embodiment, the DSP chip is a Motorola 56000 processor chip. However, other DSP chips and their equivalents are also contemplated by this invention. The digital data 97 received from the ADI board is input to the DSP chip which performs preliminary processing of the digital data. The pre-processed data 100 is then output to a local memory 102 where it is stored until it can be transferred to the DPM. The local memory also stores an operating program which is down-loaded from the DPM, for controlling the radar. The DSP chip executes the operating program and thereby generates and outputs a plurality of signals for controlling operation of the focussed array radar according to the operating program. These signals include digital words 105 for setting the delays of the transmit 120 and receive 122 micro delay elements as well as the range delay element 114.

Still referring to FIG. 7, the CCB also includes a pulse repetition interval (PRI) generator 104 which generates and outputs a trigger signal 106 which is fed to transmit micro delay elements 120, and macro range delay element 114. The macro delay element 114 delays the transmit trigger signal 106 and outputs a receive trigger signal 118 which is delayed with respect to the transmit trigger signal 106. The value of this range delay can be selected to delay the timing of the receive antenna elements to look to a certain penetration depth of the earth as discussed above.

As shown in FIG. 7, the transmit 106 and receive 118 trigger signals are divided into a plurality of parallel trigger signals which are input to the plurality of parallel transmit 120 and receive 122 micro delay elements. The plurality of transmit and receive micro delay elements delay the transmit and receive trigger signals with respect to one another. The parallel transmit and receive delay elements output transmit 78 and receive 82 timing signals for the purpose of focussing the transmit and receive illumination patterns across the width of the antenna as discussed above. In this specific embodiment of the invention the transmit and receive micro time delay elements are digitally programmable and the time delay can be incrementally stepped in binary steps via the digital word 105 output by the DSP. The transmit and receive micro delay elements have eight bits of resolution and can be incrementally stepped through 256 different possible time delays. In addition, there a four transmit and receive micro delay elements for driving four antenna elements operating in both the transmit and receive mode.

Still referring to FIG. 7, the custom control board also includes a host interface circuit 101 for connecting the CCB to the DPM. The host interface circuit controls the transfer of data between the CCB and the DPM. In addition, the CCB includes an enable register 124 for turning on and off of the plurality of transmit and receive micro-delay elements. More specifically, it is desirable for calibration purposes to individually turn on and off each transmit and receive micro delay element for the purpose of calibrating the time delay through the delay elements.

Figure 8A:
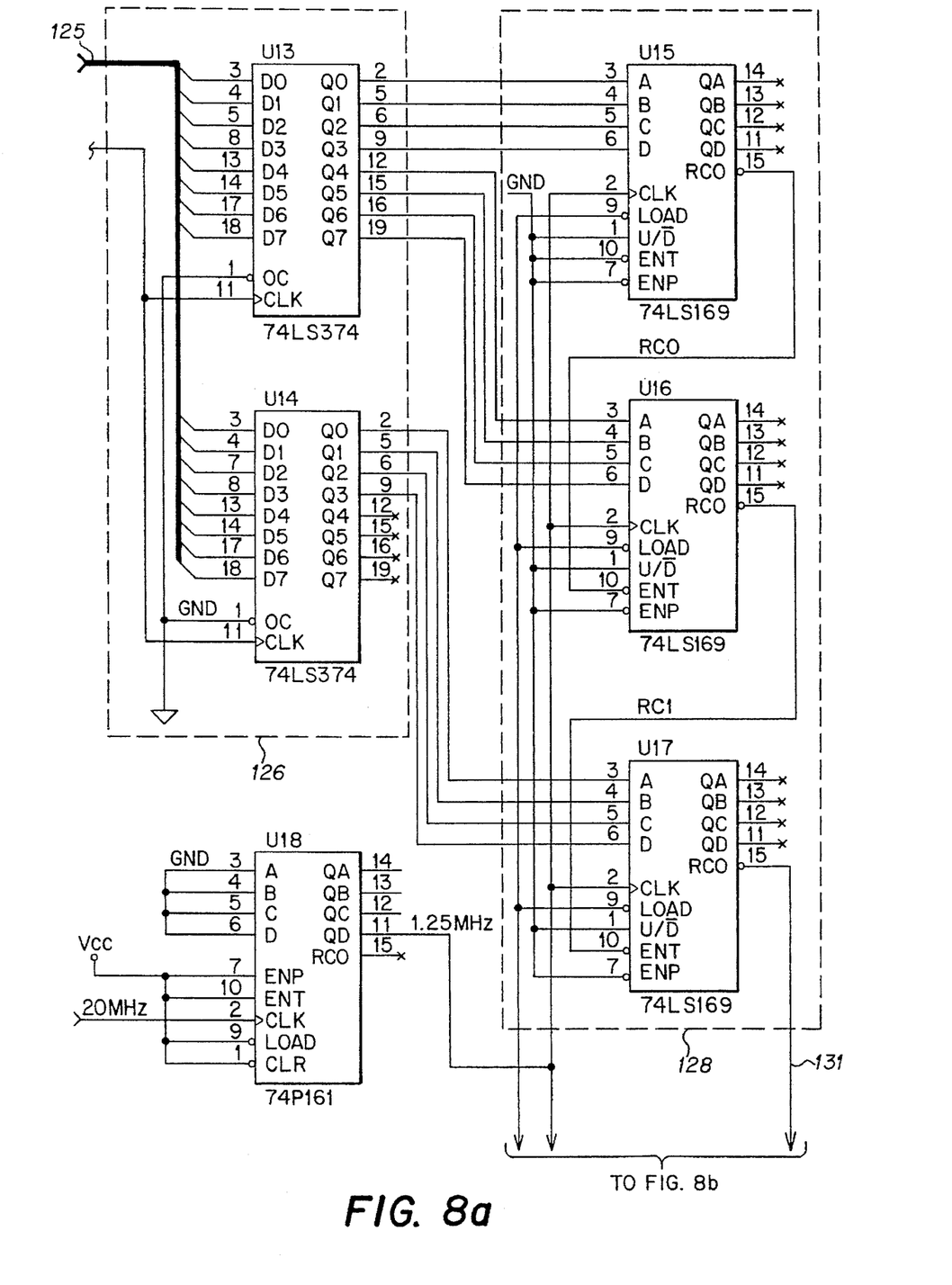
Figure 8B:
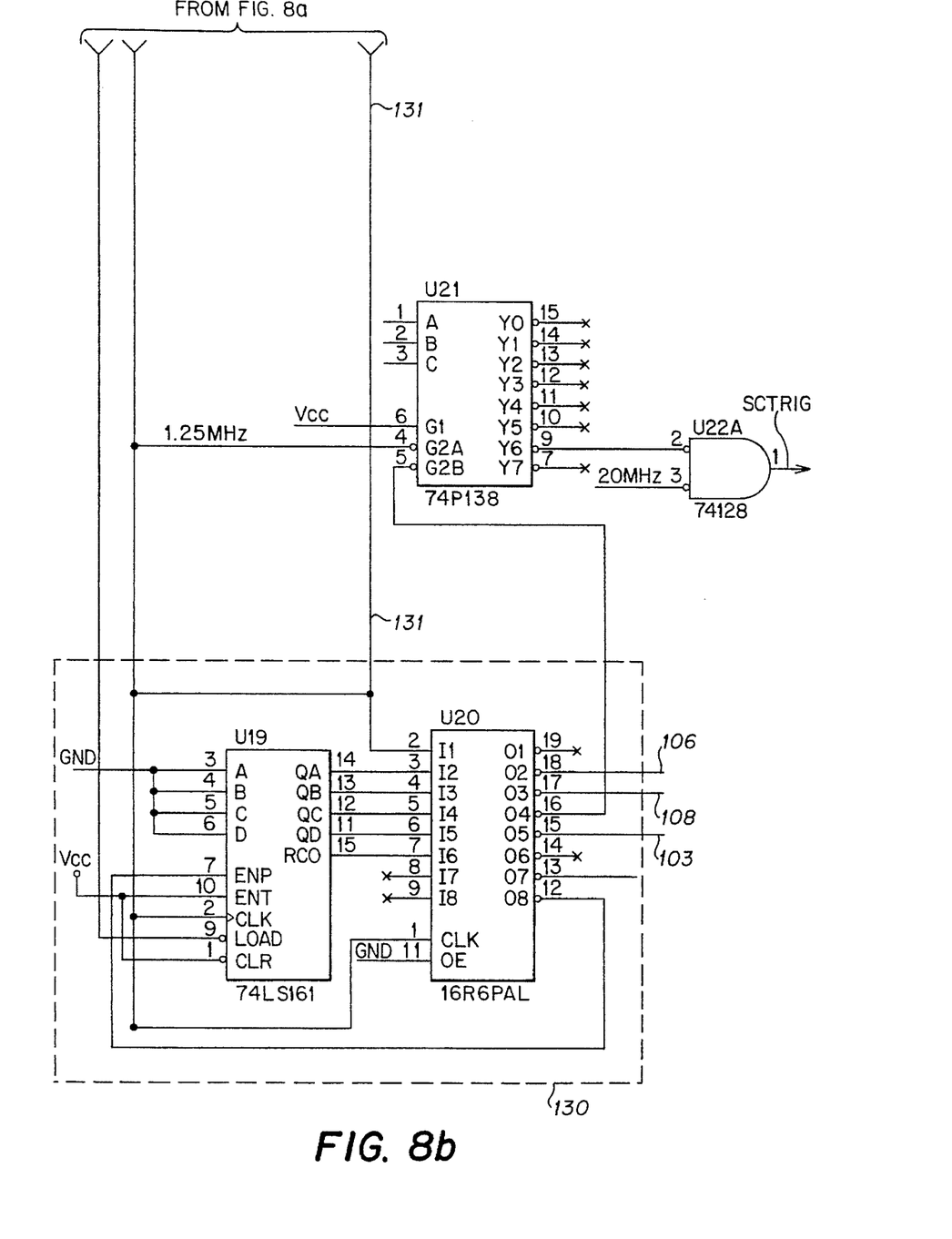

Referring now to FIG. 8, there is shown a schematic of circuitry implementing the PRI generator of FIG. 7. The PRI generator includes a register 126 consisting of chips U13 and U14 which are commercially available 74LS374's. The register receives a digital word 125 output by the DSP, which is input to pins D0–D7 of chips U13 and U14, the register buffers the digital word and outputs the digital word via pins Q0–Q7 of chips U13 and U14 to a 12-bit down counter 128. The counter 128 is comprised of chips U15, U16, and U17 which are commercially available 74LS374's arranged to operate as a 12-bit down counter. Each chip receives four bits of the digital word output by the register at pins 3–6 and upon reception counts down to the value of "0". Upon reaching the value of "0", the counter receives another 12-bit value from the register 126 and also initiates operation of the state machine 130 via the initiation signal 131.

The state machine is comprised of a counter chip U19 and a 16R6PAL chip U20. The state machine upon reception of the initiation signal 131, generates a series of signals for controlling the radar. The signals include the trigger signal 106 which is output to the transmit micro delay elements and the receive macro delay element 114. Calibration trigger signal 108 is output to a sampling oscilloscope for triggering the oscilloscope 75 nanoseconds before transmit and receive pulses are to be displayed on the oscilloscope for calibration purposes. The calibration trigger signal is needed in order to trigger the oscilloscope to display the transmit and receive pulses so that the delays of the micro transmit 120 and receive 122 delay elements can be calibrated. The convert to digital signal 103 is output to the plurality of analog to digital converters in the ADI board for triggering analog to digital conversion of the voltage value held in the plurality of sample and hold circuits 84, as best shown in FIG. 7.

Figure 9A:
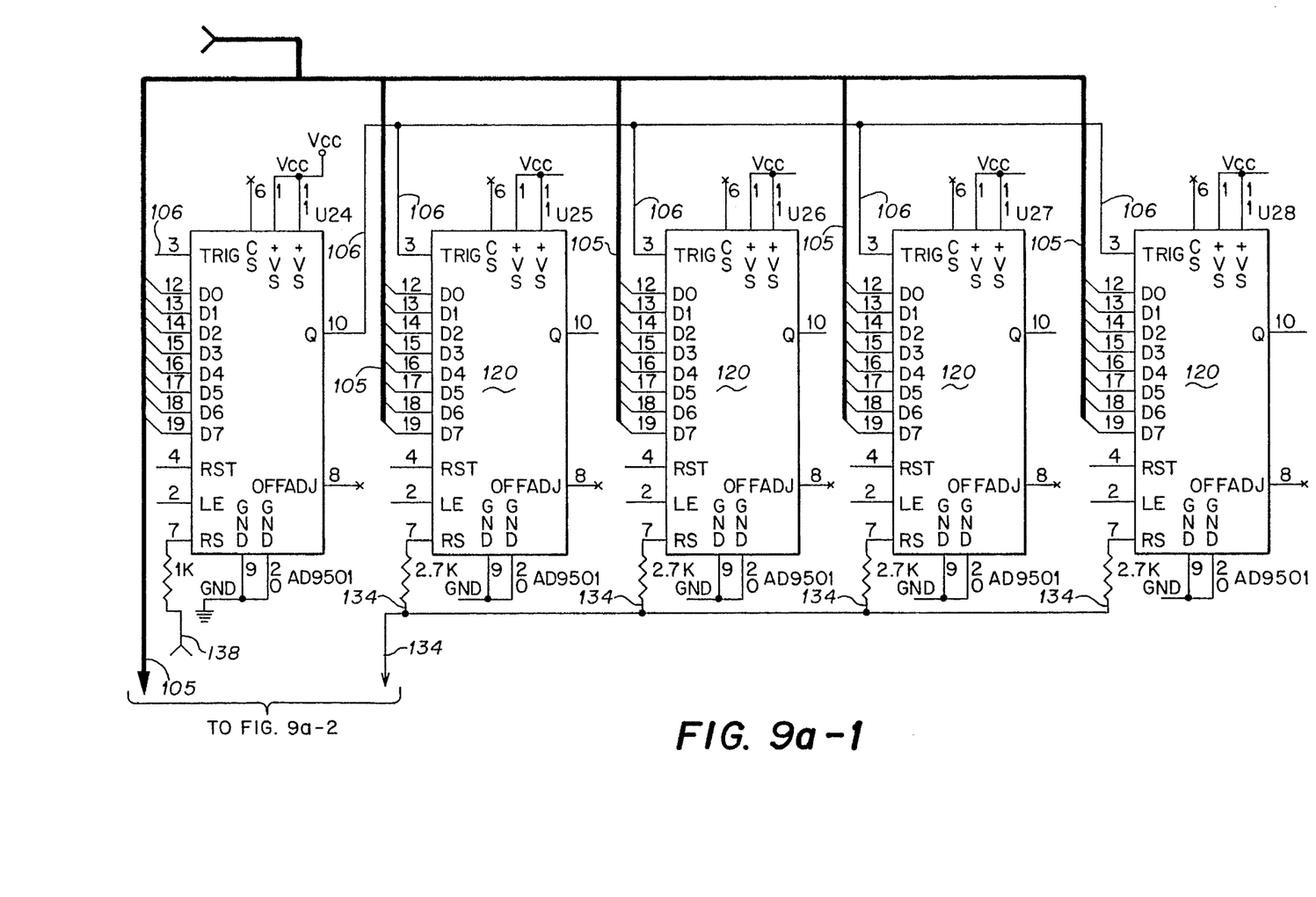
Figure 9A:
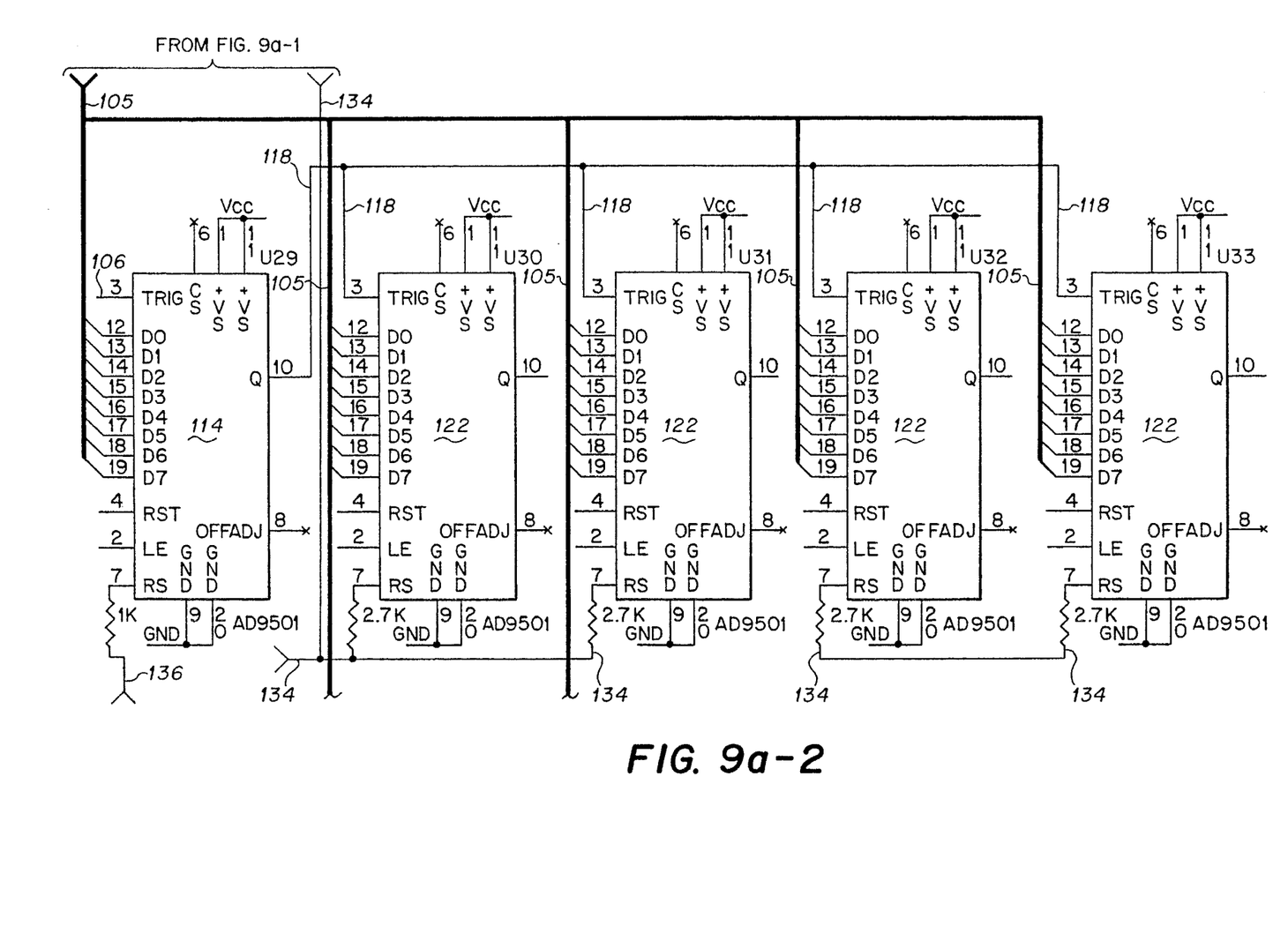
Figure 9B:
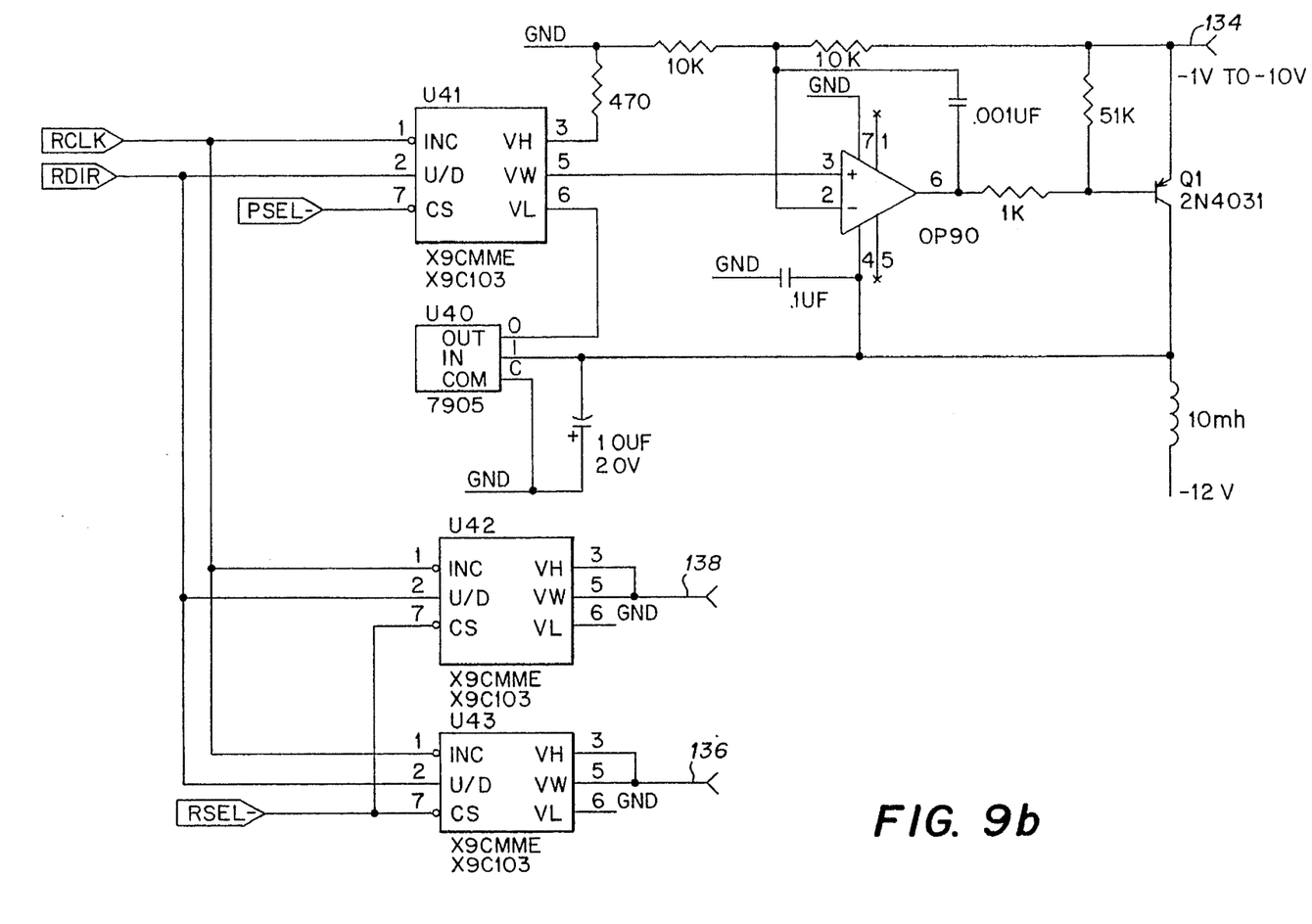

FIGS. 9a and 9b are a schematic diagrams of circuits implementing the transmit micro 120, receive micro 122 and receive macro 114 delay elements. In this specific embodiment, each delay element U24–U32 comprises a commercially available AD9501 chip manufactured by Analog Devices, Inc. An 8-bit digital word is input to the AD9501 chip at pins 12–19. In addition, a fine delay control of each chip is accomplished by varying a current drawn by each chip at an RS terminal at pin 7 of each chip. A circuit for varying the current draw at the RS terminal of each AD9501 chip is shown in FIG. 9b.

Referring now to FIG. 9a, the transmit trigger signal 106, as best shown in FIG. 7, is input to pin 3 of chips U24 and U29. Chip U24 creates a delay of the transmit trigger signal. Chip U29 comprises the range delay element 114 for creating the macro delay between the transmit and receive trigger signals as discussed above. The range delay signal 118 output of chip U29 is then fed to four parallel AD9501 chips U30–U33 and the delayed trigger signal 106 is output to chips U25–U28. Chips U25–U28 and U30–U33 chips respectively comprise the transmit 120 and receive 122 micro delay elements for delaying the transmit and receive antenna elements with respect to one another as discussed above.

Referring now to FIG. 9b, each of the AD9501 chips of FIG. 9a has a fine delay control terminal RS. The fine delay terminals of the transmit and receive micro delay elements U25–U28 and U30–U33 are labeled 124; the fine delay terminal of the macro delay element 114 is labeled 126; and the fine delay terminal of the transmit trigger delay element U24 is labeled 128. The current drawn by the fine delay terminals controls a slope of an internal voltage ramp. By varying the slope of the voltage ramp, the time delay of each chip can be finely controlled. Thus a large current draw will yield a large voltage slope, while a low current draw will yield a small slope and a larger timing control range.

In a specific embodiment of this invention the current drawn by the RS terminal of the delay elements is controlled by digitally programmable resistors U41–U43, as shown in FIG. 9b. A voltage at the RS terminal of each AD9501 chip is constant, while the current is varied by changing the value of resistors U41–U43 which are connected between the RS terminal and ground. Referring to FIG. 9a, the RS terminal of chips U25–U28 and U30–U33 are connected to output 124 of the circuit shown in FIG. 9b. Referring to FIG. 9b, chip U41 provides a reference voltage which is amplified by chip U39 and output as signal 124. Signal 124 thus provides the fine delay control signal to the transmit 120 and receive 122 micro delay elements. In addition, chips U42 and U43 provide current signals 128 and 126 which are respectively connected between the RS terminals of chips U24 and U29 and ground.

Having now described a specific embodiment of the invention, it should be obvious to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

What is claimed is:

1. A focused array radar for measuring subsurface strata, below an air-to-earth interface comprising:

an antenna array module including a plurality of antenna elements, responsive to a plurality of transmit and a plurality of receive control signals, wherein said antenna elements transmit a plurality of RF pulsed signals in a focused transmit illumination pattern focused on the sub-surface strata and receive a plurality of RF pulsed signals back-scattered by objects within a received illumination pattern focused on the sub-surface strata; and a custom control module which generates a plurality of transmit and a plurality of receive timing signals, delays the plurality of transmit and the plurality of receive timing signals, relative to one another, to form the plurality of transmit and the plurality of receive control signals and outputs the plurality of transmit and the plurality of receive control signals to the antenna array module.

2. A focused array radar as claimed in claim 1, wherein the antenna array module outputs the received RF pulsed signals to the custom control module and the custom control module further comprises:

an analog-to-digital interface board, responsive to the plurality of received RF pulsed signals, which samples the plurality of received pulsed signals into a plurality of analog values, converts the plurality of sampled analog values into a plurality of digital data and outputs the plurality of digital data; and a custom control board, responsive to the plurality of digital data, which pre-processes the plurality of digital data, temporarily stores and outputs the pre-processed digital data.

3. A focused array radar as claimed in claim 2, further comprising:

a data processing module which receives and processes the pre-processed digital data into a final format for presentation to a user, in real-time, and which permanently stores the digital data.

4. A focused array radar, comprising:

an antenna array module including a plurality of antenna elements, responsive to a plurality of transmit and a plurality of receive control signals, wherein said antenna elements transmit a plurality of RF pulsed signals in a focused transmit illumination pattern and receive a plurality of RF pulsed signals within a received illumination pattern; and a custom control module which generates a plurality of transmit and a plurality of receive timing signals, delays the plurality of transmit and the plurality of receive timing signals, relative to one another, to form the plurality of transmit and the plurality of receive control signals, the custom control module including:

an analog-to-digital interface board, responsive to the plurality of received RF pulsed signals, which samples the plurality of received RF pulsed signals into a plurality of analog values, converts the plurality of sampled analog values into a plurality of digital data and outputs the plurality of digital data; and a data processing module which receives and processes pre-processed digital data into a final format and permanently stores the digital data;

a custom control board, responsive to the plurality of digital data, which pre-processes the plurality of digital data and temporarily stores and outputs the pre-processed digital data, wherein the custom control board comprises:

means for generating and outputting the plurality of transmit and the plurality of receive timing signals;

means for generating and for outputting a convert-to-digital timing signal;

a digital signal processor, responsive to the plurality of digital data, which pre-processes the plurality of digital data and outputs the pre-processed digital data; and a memory array, responsive to the pre-processed digital data which temporarily stores the pre-processed digital data and outputs the pre-processed digital data, upon receipt of a signal to transfer the digital data, to the data processing module.

5. A focused array radar as claimed in claim 4, wherein the custom control module further comprises:

an array interface board including a plurality of pulsers, responsive to the plurality of transmit and the plurality of receive control signals, which amplify the plurality of transmit and the plurality of receive control signals and output a plurality of transmit and a plurality of receive amplified control signals, to the antenna array module.

6. A focused array radar as claimed in claim 5 wherein the analog-to-digital interface board comprises:

a plurality of amplifiers, each responsive to a respective one of the received RF pulsed signals, which amplify the respective received RF pulsed signal and output an amplified signal;

a plurality of samplers, each responsive to the respective amplified signal, which sample the respective amplified signal and output a respective one of the plurality of sampled analog values;

a plurality of buffers, each responsive to the respective sampled analog signal, which hold the respective analog value and outputs the analog value;

a plurality of analog-to-digital converters, each responsive to the respective analog value and the convert-to-digital signal, which converts the respective analog value into the plurality of digital data and output the plurality of digital data.

7. A focused array radar system as claimed in claim 4, wherein the antenna array module comprises:

at least four antenna elements.

8. A focused array radar system as claimed in claim 5, wherein the antenna array module further comprises:

a plurality of means, each responsive to a respective one of the plurality of transmit amplified control signals, for converting the plurality of transmit amplified control signals into the plurality of RF pulsed signals and for coupling the plurality of RF pulsed signals to the antenna elements; and a plurality of means, each responsive to a respective one of the plurality of receive control signals, for turning on the plurality of antenna elements.

9. A focused array radar system as claimed in claim 8, wherein each one of the plurality of antenna elements include:

a resistively loaded rhombic antenna.

10. A focused array radar system as claimed in claim 8, wherein each one of the converting means comprises:

a transistor, responsive to the respective transmit control signal and a bias signal, operating in an avalanche mode and which outputs the pulsed RF signal of substantially the same pulse width as the transmit control signal.

11. A focused array radar system as claimed in claim 4, wherein the custom control board further comprises:

means, responsive to a transmit timing signal, for delaying the transmit timing signal and for outputting a delayed receive timing signal;

means, responsive to the transmit timing signal, for dividing the transmit timing signal into the plurality of transmit timing signals and for outputting the plurality of transmit timing signals;

means, responsive to the delayed receive timing signal, for dividing the receive timing signal into the plurality of receive timing signals and for outputting the plurality of receive timing signals;

a plurality of means, each responsive to a respective one of the plurality of transmit timing signals, for delaying the respective transmit timing signals relative to one another and for outputting the plurality of transmit control signals; and a plurality of means, each responsive to a respective one of the plurality of receive timing signals, for delaying the respective receive timing signals relative to one another and for outputting the plurality of receive control signals.

12. A custom control board for controlling a plurality of

RF pulsed signals transmitted and received by a plurality of antenna elements to form focused transmit and receive antenna illumination patterns, the custom control board comprising:

means for generating and outputting a transmit timing signal;

means, responsive to the transmit timing signal, for dividing the transmit timing signal into a plurality of parallel transmit timing signals and for outputting the plurality of parallel transmit timing signals; and     means, responsive to the transmit timing signal, for delaying the transmit timing signal and for outputting a delayed receive timing signal;

means, responsive to the delayed receive timing signal, for dividing the delayed receive timing signal into a plurality of parallel receive timing signals and for outputting the plurality of parallel receive timing signals;

a plurality of means, each responsive to a respective one of the plurality of parallel transmit timing signals, for delaying the respective transmit timing signals relative to one another and for outputting a plurality of transmit control signals; and     a plurality of means, each responsive to a respective one of the plurality of parallel receive timing signals, for delaying the respective receive timing signals relative to one another and for outputting a plurality of receive control signals.

13. A custom control module for controlling a timing of respective RF pulsed signals transmitted by a plurality of antenna elements so as to form a transmit antenna illumination pattern for studying sub-surface strata, and for controlling timing of a plurality of antenna elements receiving a plurality of back-scattered RF pulsed signals so as to form a receive antenna illumination pattern for studying the sub-surface strata, the custom control module comprising:

a custom control board for generating and outputting a plurality of transmit and a plurality of receive control signals, delayed relative to one another; and     an array interface board, responsive to the plurality of transmit and the plurality of receive control signals, for amplifying the plurality of transmit and the plurality of receive control signals and for outputting a plurality of amplified transmit and a plurality of amplified control signals, to the plurality of antenna elements.

14. A custom control module as claimed in claim 13 wherein the custom control module further comprises:

an analog-to-digital interface board, responsive to the plurality of received RF pulsed signals for amplifying the plurality of received RF pulsed signals into a plurality of amplified signals, for sampling the plurality of amplified signals into a plurality of analog values, for converting the plurality of analog values into a plurality of digital data and for outputting the plurality of digital data.

15. A custom control module as claimed in claim 14 wherein the custom control board further comprises:

means, responsive to the plurality of digital data, for pre-processing and temporarily storing the plurality of digital data.

16. A custom control module as claimed in claim 13 wherein the custom control board further comprises:

means for generating and outputting a transmit timing signal;

means, responsive to the transmit timing signal, for delaying the transmit timing signal and for outputting a delayed receive timing signal;

means, responsive to the transmit timing signal, for dividing the transmit timing signal into a plurality of parallel transmit timing signals and for outputting the plurality of parallel transmit timing signals;

means, responsive to the delayed receive timing signal, for dividing the receive timing signal into a plurality of parallel receive timing signals and for outputting the plurality of parallel receive timing signals;

a plurality of means, each responsive to a respective one of the plurality of parallel transmit timing signals, for delaying the respective transmit timing signals relative to one another and for outputting the plurality of transmit control signals; and     a plurality of means, each responsive to a respective one of the plurality of parallel receive timing signals, for delaying the respective receive timing signals relative to one another and for outputting the plurality of receive control signals.

17. A focused array radar comprising:

an antenna array module including a plurality of antenna elements, responsive to a plurality of transmit and a plurality of receive control signals, wherein said plurality of antenna elements transmit a plurality of RF pulsed signals in a focused transmit illumination pattern and said plurality of antenna elements receive a plurality of RF pulsed signals within a received illumination pattern; and     means for generating the plurality of transmit control signals and the plurality of receive control signals and delaying the plurality of transmit control signals, with respect to each other, to form the transmit illumination pattern and for delaying the plurality of receive control signals, with respect to each other, to form the receive illumination pattern.

18. The focused array radar as claimed in claim 17, further comprising a plurality of means, each responsive to a respective one of the plurality of transmit control signals, for amplifying the respective plurality of transmit control signals and for outputting a plurality of amplified transmit control signals, to the antenna array module.

19. The focused array radar of claim 17, further comprising a plurality of means, each responsive to a respective one of the plurality of received RF pulsed signals, for sampling the respective received RF pulsed signal into a respective analog value, for converting the respective analog value into a respective digital value and for outputting the respective digital value.

20. The focused array radar as claimed in claim 19, wherein the plurality of means for sampling and the plurality of means for converting include:

a plurality of amplifiers, each responsive to the respective received RF pulsed signal, for amplifying the respective received RF pulsed signal and for outputting a respective amplified signal;

a plurality of samplers, each responsive to the respective amplified signal, for sampling the respective amplified signal and for outputting the respective sampled analog value;

a plurality of buffers, each responsive to the respective sampled analog value, for holding the respective analog value and for outputting the respective analog value; and     a plurality of analog-to-digital converters, each responsive to the respective analog value and a convert-to-digital signal, for converting the respective analog value into the respective digital data and for outputting the respective digital data.

21. A focused array radar comprising:

an antenna array module including a plurality of antenna elements, responsive to a plurality of transmit control signals and a plurality of received control signals, wherein said plurality of antenna elements transmit a plurality of RF pulsed signals in a focused transmit illumination pattern and receive a plurality of RF pulsed signals within a received illumination pattern;

means for generating and outputting a transmit timing signal;

means, responsive to the transmit timing signal, for dividing the transmit timing signal into a plurality of parallel transmit timing signals and for outputting the plurality of parallel transmit timing signals; and means, responsive to the transmit timing signal, for delaying the transmit timing signal and for outputting a delayed receive timing signal;

means, responsive to the delayed receive timing signal, for dividing the delayed receive timing signal into a plurality of parallel receive timing signals and for outputting the plurality of parallel receive timing signals;

a plurality of means, each responsive to a respective one of the plurality of parallel transmit timing signals, for delaying the respective transmit timing signals, relative to one another, and for outputting the respective plurality of transmit control signals; and a plurality of means, each responsive to a respective one of the plurality of parallel receive timing signals, for delaying the respective receive timing signals, relative to one another, and for outputting the respective plurality of receive control signals.

* * * * *